United States Patent
Srinivasan et al.

(10) Patent No.: US 11,575,609 B2
(45) Date of Patent: Feb. 7, 2023

(54) TECHNIQUES FOR CONGESTION MANAGEMENT IN A NETWORK

(71) Applicant: Intel Corporation, Santa Clara, CA (US)

(72) Inventors: Arvind Srinivasan, San Jose, CA (US); Ramakrishna Huggahalli, Scottsdale, AZ (US); Parthasarathy Sarangam, Portland, OR (US); Sunil Ahluwalia, Portland, OR (US); Mrittika Ganguli, Tempe, AZ (US); Malek Musleh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/517,358

(22) Filed: Jul. 19, 2019

(65) Prior Publication Data

US 2019/0386924 A1   Dec. 19, 2019

(51) Int. Cl.
*H04L 47/2441* (2022.01)
*H04L 47/122* (2022.01)
*H04L 47/11* (2022.01)

(52) U.S. Cl.
CPC ........ *H04L 47/2441* (2013.01); *H04L 47/115* (2013.01); *H04L 47/122* (2013.01)

(58) Field of Classification Search
None
See application file for complete search history.

(56) References Cited

U.S. PATENT DOCUMENTS

| | | | | |
|---|---|---|---|---|
| 6,505,253 | B1* | 1/2003 | Chiu | H04L 1/1832 370/254 |
| 7,730,201 | B1* | 6/2010 | McAllister | H04L 12/5602 709/239 |
| 9,210,063 | B2* | 12/2015 | Ishikawa | H04L 47/32 |
| 11,153,211 | B2* | 10/2021 | Ravi | H04L 47/2425 |

(Continued)

FOREIGN PATENT DOCUMENTS

EP   3461082 A1   3/2019

OTHER PUBLICATIONS

Asaf Samuel et al., "Routing Keys", 2017 IEEE 25th Annual Symposium on High-Performance Interconnects (HOTI), Aug. 2017, 8 pages.

(Continued)

*Primary Examiner* — Christopher T Wyllie
(74) *Attorney, Agent, or Firm* — Compass IP Law PC

(57) ABSTRACT

A switch or network interface can detect congestion caused by a flow of packets. The switch or network interface can generate a congestion hint packet and send the congestion hint packet directly to a source transmitter of the flow of packets that caused the congestion. The congestion hint packet can include information that the source transmitter can use to determine a remedial action to attempt to alleviate or stop congestion at the switch or network interface. For example, the transmitter can reduce a transmit rate of the flow of packets and/or select another route for the flow of packets. Some or all switches or network interfaces between the source transmitter and a destination endpoint can employ flow differentiation whereby a queue is selected to accommodate for a flow's sensitivity to latency.

24 Claims, 14 Drawing Sheets

(56) References Cited

U.S. PATENT DOCUMENTS

| | | | |
|---|---|---|---|
| 2002/0041328 A1* | 4/2002 | LeCompte | G01C 11/025 348/144 |
| 2002/0099854 A1* | 7/2002 | Jorgensen | H04L 9/40 370/310 |
| 2003/0076781 A1* | 4/2003 | Enomoto | H04L 47/10 370/229 |
| 2005/0157750 A1* | 7/2005 | Rabie | H04L 12/28 370/466 |
| 2006/0015639 A1* | 1/2006 | Taylor | H04L 47/35 709/235 |
| 2006/0018329 A1* | 1/2006 | Nielsen | H04L 49/254 370/401 |
| 2006/0056308 A1* | 3/2006 | Gusat | H04L 45/00 370/254 |
| 2006/0159016 A1* | 7/2006 | Sagfors | H04W 72/0433 370/230 |
| 2006/0203730 A1* | 9/2006 | Zur | H04L 47/263 370/395.43 |
| 2006/0215550 A1* | 9/2006 | Malhotra | H04L 47/263 370/229 |
| 2007/0058532 A1* | 3/2007 | Wadekar | H04L 47/33 370/229 |
| 2007/0076604 A1* | 4/2007 | Litwack | H04L 47/266 370/230 |
| 2007/0127381 A1* | 6/2007 | Oh | G08G 1/0104 370/235 |
| 2008/0259798 A1* | 10/2008 | Loh | H04L 47/10 370/235 |
| 2009/0238068 A1* | 9/2009 | DeCusatis | H04L 47/13 370/229 |
| 2010/0039937 A1* | 2/2010 | Ramanujan | H04L 47/263 370/235 |
| 2010/0246583 A1* | 9/2010 | Morinaga | H04L 41/0677 370/392 |
| 2011/0044169 A1* | 2/2011 | Liu | H04W 28/021 370/235 |
| 2011/0069616 A1* | 3/2011 | Revels | H04L 47/10 370/236 |
| 2011/0202926 A1* | 8/2011 | Chambliss | G06F 9/5038 718/104 |
| 2011/0255410 A1* | 10/2011 | Yamen | H04L 47/11 370/237 |
| 2012/0008502 A1* | 1/2012 | Kadambi | H04L 49/50 370/236 |
| 2012/0320779 A1* | 12/2012 | Smith | H04L 47/26 370/252 |
| 2013/0246650 A1* | 9/2013 | Tsuboki | H04L 12/4633 709/236 |
| 2014/0071831 A1* | 3/2014 | Sinha | H04L 43/0882 370/241.1 |
| 2014/0233382 A1* | 8/2014 | Matthews | H04L 47/12 370/232 |
| 2015/0071072 A1* | 3/2015 | Ratzin | G06F 9/544 370/235 |
| 2015/0156082 A1* | 6/2015 | Kakadia | H04L 41/5019 709/223 |
| 2015/0163117 A1* | 6/2015 | Lambeth | H04L 47/2441 709/224 |
| 2015/0195209 A1* | 7/2015 | Bottorff | H04L 47/263 370/230 |
| 2015/0271081 A1* | 9/2015 | Arumilli | G06F 13/385 370/235 |
| 2016/0050653 A1* | 2/2016 | Rastogi | H04W 72/10 455/453 |
| 2016/0113025 A1* | 4/2016 | Shaw | H04W 72/087 455/450 |
| 2016/0308769 A1* | 10/2016 | VerSteeg | H04L 47/52 |
| 2018/0343206 A1* | 11/2018 | White | H04L 47/11 |
| 2019/0089644 A1* | 3/2019 | Shpiner | H04L 49/30 |
| 2019/0280982 A1* | 9/2019 | Shiraki | H04L 47/6255 |

OTHER PUBLICATIONS

Cisco, "Hierarchical Queuing Framework", White Paper, 2008 Cisco Systems, Inc., Jul. 2008, 9 pages.

Davide Bergamasco, "Data Center Ethernet Congestion Management: Backward Congestion Notification", Cisco Systems, Inc., IEEE 802.1 Interim Meeting, Berlin, Germany, May 12, 2005, 25 pages.

James McCauley et al., "Thoughts on Load Distribution and the Role of Programmable Switches", ACM SIGCOMM Computer Communication Review, vol. 49 Issue 1, Jan. 2019, 6 pages.

TechLibrary, "Data Center Quantized Congestion Notification (DCQCN)", Juniper Networks, Inc., Oct. 4, 2018, 8 pages.

Transition Networks, The Conversion Technology Experts, "Quality of Service (QoS) in High-Priority Applications", www.transition.com/.../uploads/2016/05/qos_wp.pdf, 2016, 12 pages.

William Stallings, "Quality of Service (QoS) for Local Area Networks (LANs)", informIT, Prentice Hall, Feb. 15, 2002, 4 pages.

Extended European Search Report for Patent Application No. 20164676.7, dated Nov. 4, 2020, 10 pages.

Fei Chen et al., "Data Center Congestion Management requirements", Huawei Technologies Co. Ltd., Jul. 2019, 9 pages.

K. Ramakrishnan et al., "The Addition of Explicit Congestion Notification (ECN) to IP", TeraOptic Networks, EMC, Sep. 2001, 64 pages.

Mohammad Alizadeh et al., "Data Center Transport Mechanisms: Congestion Control Theory and IEEE Standardization", 46th Annual Allerton Conference, Illinois, USA, Sep. 2008, 8 pages.

* cited by examiner

TECHNIQUES FOR CONGESTION MANAGEMENT IN A NETWORK

TECHNICAL FIELD

Various examples described herein relate to traffic congestion management in a network.

BACKGROUND

Data centers provide vast processing, storage, and networking resources to users. For example, smart phones or internet of things (IoT) devices can leverage data centers to perform computation, data storage, or data retrieval. Data centers are typically connected together using high speed networking devices such as network interfaces, switches, or routers. Datacenter network traffic continues to increase exponentially with data-intensive usage models involving High Performance Computing (HPC) and artificial intelligence (AI) becoming more pervasive in the cloud.

Traffic flow can lead to congestion build up in a network. Congestion can occur when an ingress or egress port or queue of a network interface, switch, or router receives more traffic than it can transfer and the port or queue fills up or builds up. Congestion build up can result in packet drops, low effective throughput, and longer message completion times. In addition, network underutilization can result if some paths are congested but other paths are not congested but do not receive traffic. Congestion can also create a chain reaction that spreads congestion to other locations.

DETAILED DESCRIPTION

Figure 1A:
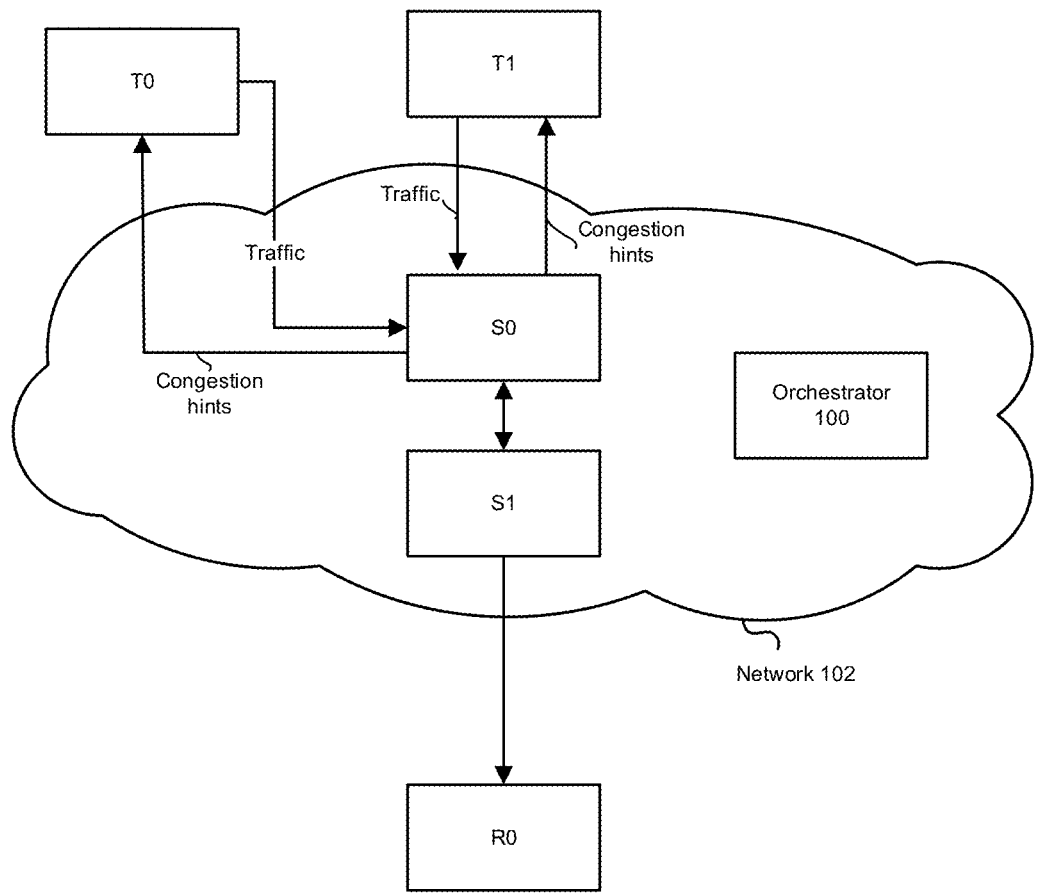
FIG. 1A depicts an example system in which some embodiments can be used.

To manage congestion, quality of service (QoS) differentiation, load balancing, and rate control through various congestion feedback mechanisms are known to be used. QoS differentiation has generally been used very selectively to distinguish between highly jitter sensitive flows to meet QoS guarantees and typical bandwidth sensitive flows. However, a very limited number of standard Traffic Classes (TCs) are available for use. In addition, there is a lack of upfront knowledge of flow latency requirements that can cause undesirable latency for latency sensitive flows.

Load balancing techniques aim to distribute network traffic proactively and reactively to take full advantage of network bandwidth. Numerous load balancing methods have been proposed in research and implemented in products. Limitations with load balancing include flowlet-like schemes require communication of significant switch state and/or are limited by unpredictable round-trip reaction time. Dynamic load balancing involves detecting congestion in a network and triggering a re-route of traffic to its endpoint. Schemes that select other routes on the fly are faster such as fine grain adaptive routing (FGAR) in HPC to re-route traffic. But FGAR can cause out of order reception of packets at an endpoint.

Rate control is an important strategy to reduce congestion and corresponding packet drops. Throttling sources of traffic attempts to reduce traffic transmit rate to alleviate congestion. However, reaction time is slow because by the time congestion information is propagated to a source, congestion can be gone. Rate control methods are generally limited by timeouts, unpredictable round-trip latencies (for acknowledgements (ACKs) or n bit explicit congestion notification (ECNs) (where n is 1 one or more)) or inference of congestion state at the source.

It is known that source-based load balancing and rate control methods are implemented as part of the transport layer. The effectiveness of both mechanisms depends on the latency of feedback mechanisms. If the transport layer is implemented in host software, further latency is induced in reacting to congestion by either load balancing or rate control.

Data Center TCP (DCTCP) (IETF RFC 8257 (2017)) and Data Center Quantized Congestion Notification (DCQCN) provide congestion notification messaging. In DCTCP, when congestion is encountered, packets are marked in the appropriate field and propagated to the destination as usual. The destination echoes the congestion information back to the source by marking returning acknowledgements. The source takes appropriate action, typically invoking a rate throttling algorithm to slow down the flow corresponding to the marked packet. In DCQCN, an explicit congestion notification packet is sent back to the source. The congestion notification packet may be sent from the destination or the switch depending on the implementation.

Various embodiments provide at least part of an end-to-end congestion management scheme with coordination between a transmitter network device that transmits a congestion causing flow and a network device that experiences congestion. A network device can be any of switch buffers, packet buffers, routers, network interfaces, or switches, or combination thereof. Descriptions with respect to a switch can also apply to any other type of network device. Descriptions with respect to a network interface can also apply to any other type of network device. Various embodiments attempt to manage end-to-end congestion by providing for one or more of: flow differentiation and queue allocation and egress scheduling based flow differentiation, Fast-path Congestion Hints (FCH) in a packet with fields to guide transmitter network device decisions (e.g., load balance or rate throttle), and system level congestion management scheme applicable by network devices in a path of a flow transmitted from a transmitter network device to a destination endpoint.

Application of flow differentiation can include extending traffic classes (TCs) with packet level fields in network devices. For example, more than 8 buckets of TCs can be supported. In response to packet fields that identify TCs, network devices can provide buffer management and scheduling. For example, a flow can be identified by one or more of: a destination port, a destination IP address, a destination port, a destination IP address, or any other packet header, preamble, or payload contents. For latency sensitive flows (e.g., mice flows), a network device can differentiate the flows in near real time.

A network device that experiences congestion can identify a source of congestion, form a Fast-path Congestion Hints (FCH) message and transmit the FCH message to a transmitter of a congestion causing flow. The source can be identified from a packet that caused or is causing congestion as a source address can be in a packets' header (e.g., 5tuple). In some examples, a source transmitter can be an intermediary network device such as a switch. In some examples, the source transmitter can use a table to determine an actual source of a congestion causing flow. The FCH message can describe nature of congestion and the source can choose whether to apply load balancing, reduce transmit rate, or modify a route of the flow. For example, a nature of congestion can include: identification of a port number that is congested and whether any other ports in the congested network device are congested or not congested (e.g., to indicate whether the congested network device is to be avoided in a re-route or attempting to steer the flow to an uncongested port on the same network device). The congested network device sends the FCH directly back to the source with higher priority and greater reliability compared to general network traffic.

System level congestion management includes processing of FCHs below the standard transport layer being used by an application. A network device can apply system level congestion management to respond dynamically to congestion identified in an FCH message using a combination of load balancing and rate control techniques and/or re-routing of a path of a flow to a destination endpoint.

FIG. 1A depicts a simplified example system in which some embodiments can be used. In this example, multiple transmitters T0 and T1 transmit packets through a network 102 to endpoint receiver R0. Network 102 includes at least network devices S0 and S1 and orchestrator 100. Network devices can be any of T0, T1, S0, S1, or R0. A network device can refer to a device that is connected to a network, fabric, interconnect, or other communications medium. Network 102 can be compatible with any one or more of: Intel QuickPath Interconnect (QPI), Intel Ultra Path Interconnect (UPI), Intel On-Chip System Fabric (IOSF), Omnipath, Ethernet, InfiniBand, Compute Express Link (CXL), HyperTransport, high-speed fabric, PCIe, NVLink, Advanced Microcontroller Bus Architecture (AMBA) interconnect, OpenCAPI, GenZ, CCIX, and variations thereof, and so forth. A software-defined network (SDN) controller or orchestrator 100 can be used to program paths of flows through network 102.

In this example, network device S0 receives traffic from transmitters T0 and T1. Device S0 experiences congestion such that it is not able to transfer received traffic to another network element or the destination in a timely manner that complies with relevant service level agreements (SLA) or applicable quality of service (QoS). In accordance with some embodiments, network device S0 detects transmitter T1 is a cause of congestion and transmits congestion hints to transmitter T1 to attempt to reduce congestion.

Figure 1B:
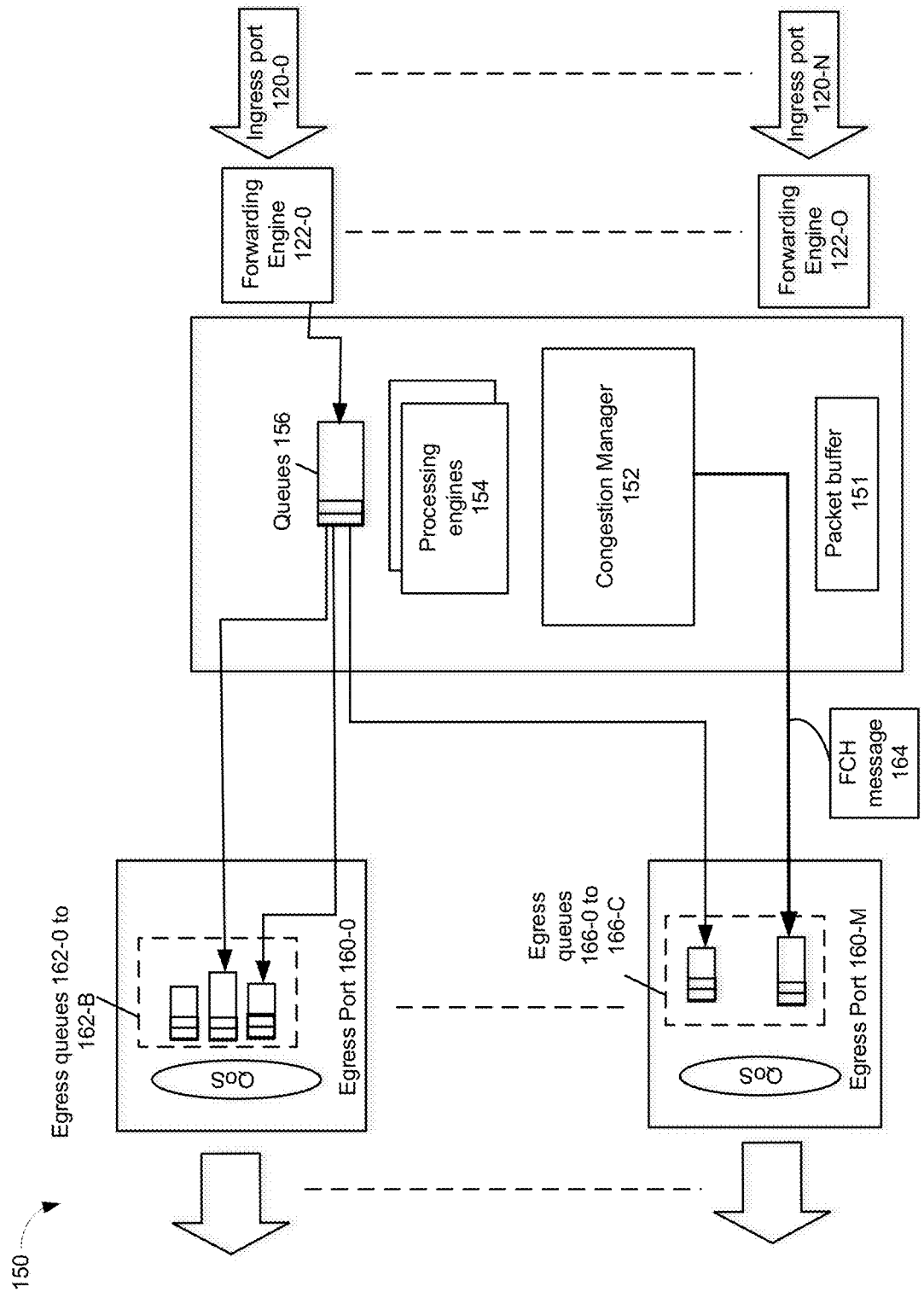
FIG. 1B depicts an example embodiment of a system in accordance with some embodiments.

FIG. 1B depicts an example embodiment of a system. System 150 can be used by any network device to provide for flow differentiation for buffer allocation and scheduling as well as congestion management by forming and transmitting Fastpath Congestion Hints (FCH) to a source transmitter that is a potential cause of congestion. Differentiation of flows can help network devices optimize dynamic buffer allocation and scheduling according to the type of flow. For example, a flow can be identified by one or more of: a destination port, a destination IP address, a destination port, a destination IP address, or any other packet header, preamble, or payload contents. Packets can be compliant with Ethernet, InfiniBand, or any public or proprietary standard.

Ingress ports 120-0 to 120-N can each have an associated forwarding engine 122-0 to 122-O. Forwarding engines 122-0 to 122-O can determine an egress port 160-0 to 160-M to use to egress a received packet. For example, forwarding engine 122-0 can forward a packet received at ingress port 120-0 to egress port 160-3 based on characteristics of the received packet header such as destination IP address or destination MAC address, or other factors.

Packet buffer 151 can store header and/or payload portions of packets received from forwarding engines 122-0 to 122-O. Queues 156 can store pointers to portions of packets in packet buffer 151. To egress a packet to a port, a pointer or packet can be transferred to an egress queue associated with an egress port. For example, an egress port 160-0 can have one or more associated egress packet queues 162-0 to 162-B whereas egress port 160-M can have associated egress packet queues 166-0 to 166-C. Each egress packet queue can be associated with a quality of service (QoS) for example and transmission from the egress packet queue is provisioned based on QoS requirements.

Congestion manager 152 can determine whether to allocate a received packet flow to a queue 156 based on flow differentiation. Congestion manager 152 can allocate packets associated with queues 156 for egress using any of egress queues 162-0 to 162-B and 166-0 to 166-C in this example. Congestion manager 152 can determine if congestion is caused or experienced by a flow and cause an FCH message 164 to be created and sent to the source of the flow(s) that caused or experienced congestion. Congestion manager 152 can be connected to some or all egress ports to detect congestion and transmit an FCH message 164. In some examples, multiple instances or copies of congestion manager 152 can be used to detect congestion and inform a source network device of one or more flows that could cause congestion. For example, an instance or copy of congestion manager 152 can be used for one or more egress ports and another instance or copy of congestion manager 152 can be used for one or more other egress ports.

Congestion manager 152 may not be able to pinpoint which specific flow is a cause of congestion and may send some congestion notifications to all relevant flows. The flows can be throttled at the source transmitter based on the rate at which congestion notifications are received or the information that the congestion notifications contain.

A network device that receives a flow can apply flow differentiation through use of different buffers for differentiated flows and adjusting scheduler priorities for the differentiated flows. For example, latency insensitive flows (e.g., elephant flows and other flow designated as latency insensitive) can be handled by congestion manager (e.g., QUIC, TCP, others) minimizing buffers for elephant flows. For example, latency sensitive flows (e.g., mice flows) can be handled by congestion manager by allocating relatively more buffer space or buffers or using buffers dedicated to latency sensitive flows. For latency sensitive flows, egress scheduling can be set such that latency sensitive queue are egressed sooner. Queues can be allocated per-flow or for multiple flows but with smaller granularity than traffic classes.

Examples of manners of determining whether to apply flow differentiation are described next. In some examples, an application program interface (API) is available for use by applications or any layer above the transport layer to mark flows based on knowledge of the type of flow and the flow's latency and bandwidth needs. For example, an application can explicitly mark a flow at least as latency sensitive or for minimum bandwidth provisioning. In some examples, Message Parsing Interface (MPI) or RDMA Verbs can be used by an application to allow for an indication that a flow is differentiated (e.g., latency sensitive or minimum bandwidth provisioning). Accordingly, system 150 can be programmed via the APIs to identify particular flows or packets can include identifies that mark their latency sensitivity or minimum bandwidth provisioning.

In some embodiments, a network device supporting different communication models (e.g., local area network (LAN) traffic, remote direct memory access (RDMA), Non-volatile memory express (NVMe), HPC-centric communication or AI-centric communication) can mark flows according to the hardware acceleration units, fixed function devices, or software that are used to process traffic. In some embodiments, system 150 monitors traffic (e.g., LAN, RDMA, and so forth) and can assign the traffic (e.g., flow) to a traffic class or flow based on how the traffic or flow is processed. For example, a network device can include or access packet processing engines 154 that perform cryptography (encryption, decryption, public key encryption (PKE), or private key encryption or decryption), data compression (DC), cipher, header processing, authentication capabilities, or other services. Based on the uses of processing engines, the network device can detect if certain processing blocks are used and infer the type of traffic is latency sensitive based on use of processing blocks. For example, the more processing engines that are used, the more likely a traffic or flow is latency sensitive as the time for performing those operations are reduced by use of the processing engines. For example, processing engines that are dedicated to perform packet processing can be implemented as one or more of: processors, central processing units, field programmable gate arrays (FPGAs), or programmable control logic.

In some embodiments, congestion manager 152 can monitor receive flow rate and use receive flow rate to differentiate flows. For a group of one or more flows, congestion manager 152 could determine receive flow rate by counting a received number of bytes per flow over a period of time. If the byte count exceeds a threshold within a time window, the flow may be classified as an elephant flow and elephant flow can be considered a latency tolerant flow. For example, an elephant flow can be a large continuous flow (in total bytes) set up by a transmission control protocol (TCP) flow (or other protocol) over a network link. By contrast, if the byte count of a flow is below a second threshold within a time window, the flow can be considered a mouse flow. A mouse flow can be considered latency sensitive. For example, a mouse flow can be a small continuous flow (in total bytes) set up by a TCP flow (or other protocol) over a network link.

In some embodiments, congestion manager 152 can determine a queue and polling rate to allocate to packets in one or more flows based on latency sensitivity or minimum bandwidth requirements. In addition, congestion manager 152 can identify congestion caused or associated with one or more flows and form an FCH for transmission to a source transmitter of the flow that is congestion causing or associated with congestion.

In some embodiments, congestion manager 152 identifies flow types (e.g., latency sensitive, latency insensitive) and creates necessary marking in header or preamble of at least one packet of the flow. For example, in addition to taking advantage of existing standard (e.g., 8) traffic classes, a number of available traffic classes can be extended using additional fields in packet headers or preamble fields. The fields can be used to tag a flow and guide buffer allocation and scheduling policies for the flow in network devices. Flow differentiation can be applied end-to-end along a path from a network interface to a destination end point.

For example, after detection of a flow type, congestion manager 152 can mark the flow as being part of a particular flow or traffic class using one or more packet headers or preamble. Network devices that receive the flow can use the mark to allocate the flow to a queue or buffer type and do not need to determine the flow classification of the flow. However, in some examples, network devices that receive the flow can make their own determination of a classification of a flow. For example, if a flow changes from latency sensitive to latency insensitive based on lack of use of processing engines 154 or changed flow rate, the flow classification can be changed by a network devices that receive the flow and marked using packet header fields or preambles.

Congestion manager 152 allocates queues for flows among queues 156 based on latency sensitivity. After a flow type terminates or is idle, a queue can be freed and available for use by another flow. For example, a flow can terminate based on an explicit marking in a header or preamble of a packet. An upstream network device that transmit flows to other network devices can identify that a flow is terminating and identify an end of the flow. The downstream (receiving) network device can de-allocate the queue for the flow after the flow terminates.

In some examples, if congestion manager 152 detects that a receive rate of a flow type is below a particular threshold level, congestion manager 152 can terminate a queue allocated to the flow and the terminated queue can be available for use by another flow. Allocating a queue to another flow or flows can include allocating associated memory space or region for use to store packets, tags, descriptors, meta data for another flow or flows.

Examples of determination of congestion and FCH generation are described next. In the event of congestion in a network device, the network device can generate an explicit FCH message and transmit the FCH message directly to the source to facilitate a faster reaction. Congestion manager 152 can detect congestion based on one or more of: overflow of packets at an ingress port, overflow of packets at an ingress queue, overflow of packets at an egress queue, overflow of packets at an egress port, incast level exceeding a threshold (e.g., more traffic to egress port than egress port can handle), packet drop rate in a transmit pipeline such as egress queues or intermediate queues that feed egress queues, bandwidth limits, queue depth exceeded. Identification of a congestion causing flow(s) can include identifying a header of packet that caused a queue to reach or exceed a threshold level. The threshold level can be a level that is associated with congestion.

In some embodiments, when or after congestion manager 152 detects a congestion or queues that are getting close to be congested, congestion manager 152 formats a message with a marking the congestion notification field of a packet for transmission back to the source transmitter of the flow. The notification packet includes header fields taken from the incoming packet that caused the congestion. For example, the source address from the packet associated with the flow that caused congestion can be set as a destination address for a packet that transports the FCH message. The source address of the packet that transports the FCH message can be set as the network device address so that the source transmitter can identify where the congestion occurred.

In some embodiments, a rate of FCH message generation and transmission can be configured by an orchestrator (e.g., orchestrator 100). For example, not every packet in a newly identified congested flow causes a corresponding FCH message to be sent to a source of congestion. An FCH message can be generated and sent after a congestion causing flow is detected and also sent periodically while congestion continues to be detected for the queue or port that receive the flow or is dropped.

Packets with FCH messages are configurable (statically or by flow differentiation) as high priority to minimize latency to the destination. FCH packets are configurable (statically or by flow differentiation) as reliable such that loss due to congestion is not allowed.

In some embodiments, an FCH message may include fields to guide decisions of a source transmitter that is a cause of a congestion causing flow or at least is directed to a congested queue or port or is dropped. A payload or preamble of a packet with the FCH message contains hints associated with congestion markings and telemetry information. For example, queue depths and congestion history as experienced by the network device over a period of time can be provided to the source transmitter. Based on the FCH message and policies set for source network device, source network device can perform load balancing or rate throttle or find an alternate route for the flow to avoid the congested network device or at least the congested port of the congested network device.

Figure 1C:
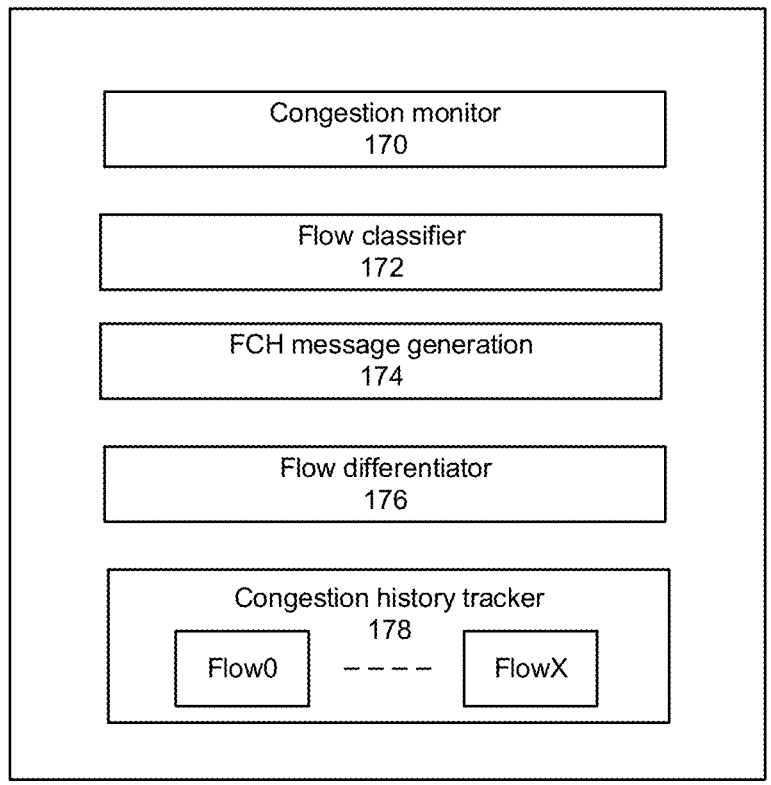
FIG. 1C depicts an example of congestion manager in accordance with some embodiments.

FIG. 1C depicts an example of a congestion manager. A network device can use a congestion manager to determine whether to apply flow differentiation or generate a congestion hint message for transmission to a source of a congestion causing flow. Congestion detector 170 can identify a congestion causing flow based on one or more of: incast level (e.g., more traffic to egress port than egress port can handle), packet drop rate in a transmit pipeline such as egress queues or intermediate queues that feed egress queues, bandwidth limits, queue depth exceeded. Identification of a congestion causing flow can include identifying a header of packet that caused a queue to reach or exceed a threshold level. The threshold level can be a level that is associated with congestion.

Flow classifier 172 can identify some or all flows received at the network device at one or more ingress ports. In some examples, after or when congestion detector 170 detects congestion, flow classifier 172 identifies a flow that caused the congestion. FCH message generator 174 can determine a source address of a transmitter associated with the flow that caused congestion and generate an FCH message to that source transmitter. Various examples of FCH messages are described herein. Flow differentiator 176 can determine a queue and egress polling policy for use by packets in a flow. For example, a flow can be identified as latency sensitive or insensitive and use various techniques described herein. Latency sensitive flows can be allocated to queues and corresponding egress polling policies that accommodate latency sensitive flows. Conversely, latency insensitive flows can be allocated to queues and corresponding egress polling policies that do not aim to accommodate latency sensitivity.

Congestion history tracker 178 can track congestion history for one or more flows using fields flow0 to flowX. For example, a number of times congestion has occurred within a period of time at a network device can be tracked. Congestion history tracker 178 can keep track of congestion states per queue or per flow. An FCH message can include the congestion history for a congestion causing flow.

Figure 1D:
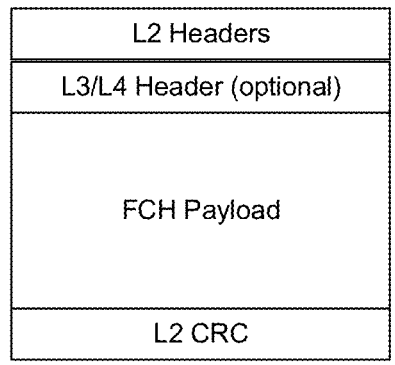
FIGS. 1D and 1E depict example formats of packets in accordance with some embodiments.

FIG. 1D depicts an example format of an FCH packet that carries an FCH message in a payload. In this example, the FCH message is in packet payload in layer 2 (L2) packet (e.g., Ethernet frame, InfiniBand packets, and so forth). A layer 3 or layer 4 (L3 or L4) header can be used. For example, a L3 or L4 header can be a User Datagram Protocol (UDP) packet header or a TCP header. In this example, a destination port specified in a UDP packet header can identify the packet as carrying FCH. The destination address of the FCH packet can have its destination address set as a source address of a network device that transmitted one or more congestion causing flow. A source address in the FCH packet can correspond to the network device that generates the FCH packet.

A payload of the FCH packet can include one or more fields described below.

| Field Name | Example Description |
| --- | --- |
| Switch ID | Source of FCH packet. Switch ID can be a shortened version of a network device destination address. Switch ID can be used as an index to a table maintained by a network device that caused congestion. |
| Flow ID Type | Indicates kind of encoding used for Flow ID. |
| Flow ID | Flow identifier corresponding to the flow causing the congestion. At least the following encoding can be used for Flow ID: flow hash derived from flow headers, subset of header fields per configuration, or entire header. The Flow ID used can be based on size of network and/or number of flows. |
| Congestion Indication | Can indicate a level of congestion such as high, medium, or low or a relative level. |

-continued

| Field Name | Example Description |
| --- | --- |
| History of Congestion | Can indicate a number of times the flow has experience congestion at this switch or NIC over period of time. |
| Rate Throttling Limits | Lower limit on bandwidth at transmitter NIC or percentage backoff to be applied by transmitter of congestion causing flow. |
| Other congested ports | Can identify any other congested port at the network device that reports congestion. This can provide a hint to a source transmitter about whether re-routing or rate throttling is to be applied. |

Figure 1E:
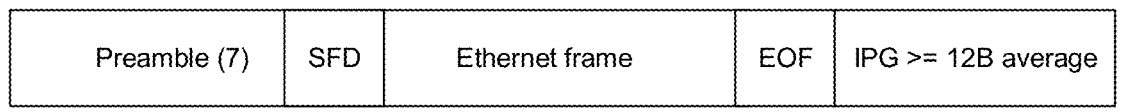

FIG. 1E depicts an example format of an FCH packet that carries an FCH message in a header or preamble of a packet. In this example, a preamble of a layer 2 packet (e.g., Ethernet frame, InfiniBand packets, and so forth) can carry the FCH message. In this example, 7 bytes are available in the preamble and some of the inter packet gap (IPG) can be used to expand size of the preamble. For example, the preamble can be up to 16 bytes. The preamble can carry one or more fields described in the following table.

| Field Name | Example Description |
| --- | --- |
| Switch ID | Source of FCH packet. Switch ID can be a shortened version of the switch (or NIC) destination address. Switch ID can be used as an index to a table maintained by a network device that caused congestion. |
| Flow TAG/ID | Truncated or hash of identifier of flow that caused congestion. |
| Congestion Source ID | Predetermined subset of source address of transmitter that originally transmitted the flow that caused congestion. For example, subset of media access control (MAC) address, subset of Internet Protocol (IP) address. MAC addresses are 6 bytes and not all bits can be communicated. If a network size is small, and there are constraints with respect to addressing, bits that matter can be sent. |
| Congestion Level | Congestion level encoded to indicated high, medium, low. |
| Error protection code | For example, a cyclic redundancy check (CRC) used to validate some or all of the FCH message. |

Figure 2A:
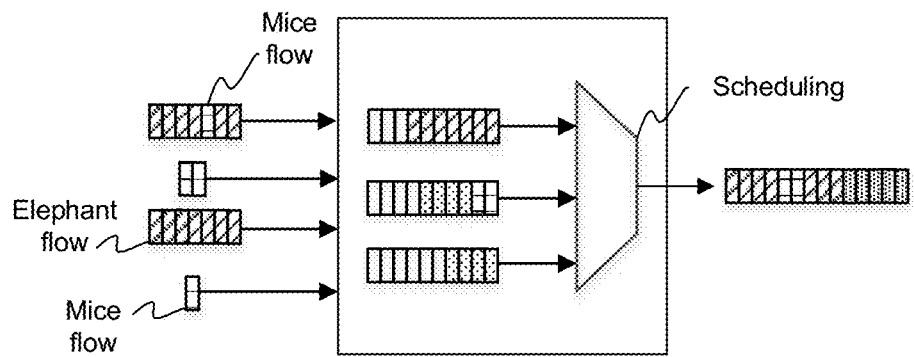
FIG. 2A depicts an example manner of queue and flow allocation based on flow differentiation in accordance with some embodiments.

FIG. 2A depicts an example manner of queue and flow allocation based on flow differentiation. In this example, elephant flows are latency insensitive but mice flows are latency sensitive. For example, other flows can be latency agnostic flows. Differentiation can be applied for latency or bandwidth sensitive flows. For example, a flow might need a bandwidth guarantee. In this example, separate queues are allocated for latency insensitive flows (e.g., elephant flows), latency sensitive flows (e.g., mice flows), and other flows. Egress scheduling can be set such that latency sensitive flows are prioritized for egress before latency insensitive flows.

Figure 2B:
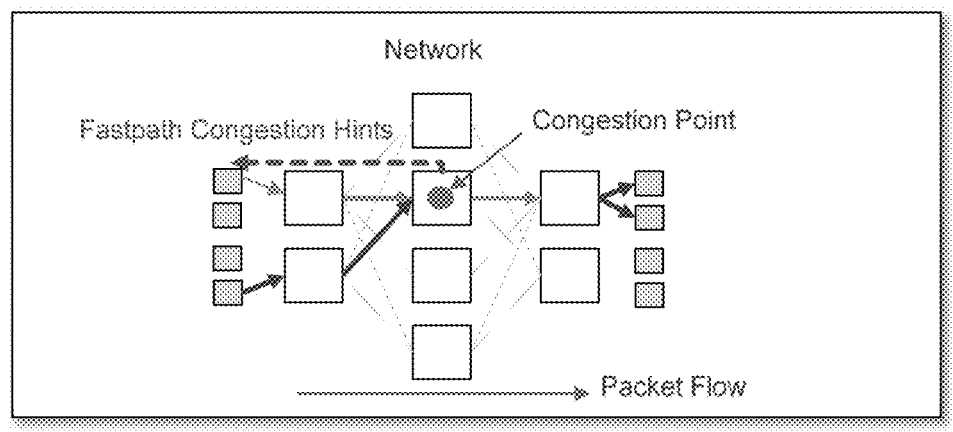
FIG. 2B depicts an example of a routing a Fastpath Congestion Hints (FCH) to a source of congestion in accordance with some embodiments.

FIG. 2B depicts an example of a routing a Fastpath Congestion Hints (FCH) message to a source of congestion. The FCH message can be sent directly to a transmitter of a flow that is associated with congestion at a network device or is received at a congested queue or port or has packet drops.

Figure 3A:
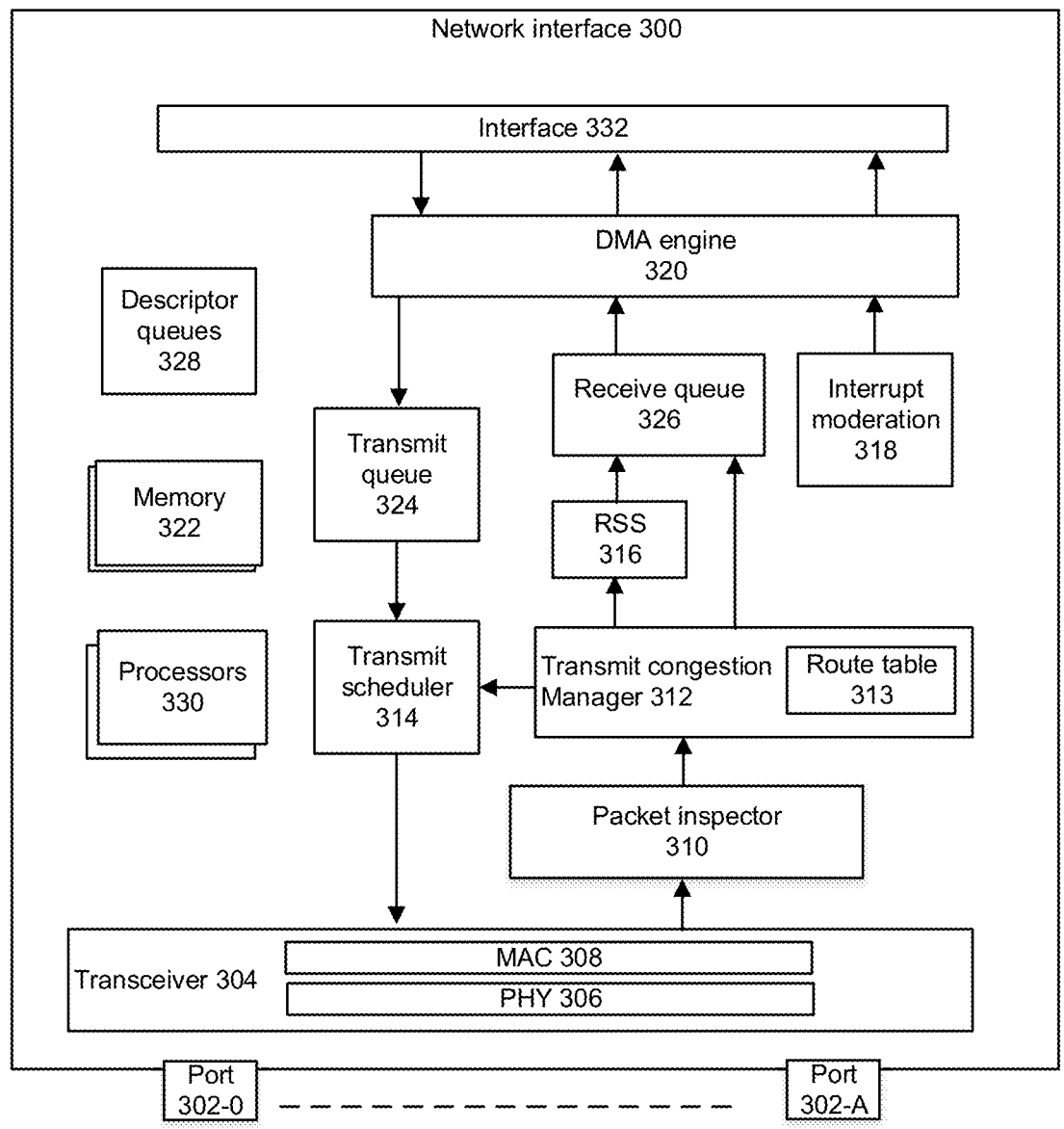
FIG. 3A depicts an example network interface controller that can respond to received FCH messages in accordance with some embodiments.

FIG. 3A depicts an example network interface controller that can respond to received FCH messages. For example, a network interface controller can mitigate congestion build up by reacting to FCHs by one or more of: reducing transmit rate, performing load balancing, and/or changing routing path of packets. Transceiver 304 can be capable of receiving and transmitting packets using any of ports 302-0 to 302-A in conformance with the applicable protocols such as Ethernet as described in IEEE 802.3-2018, although other protocols may be used. Transceiver 304 can receive and transmit packets from and to a network via a network medium (not depicted). Transceiver 304 can include PHY circuitry 306 and media access control (MAC) circuitry 308. PHY circuitry 306 can include encoding and decoding circuitry (not shown) to encode and decode data packets according to applicable physical layer specifications or standards. MAC circuitry 308 can be configured to assemble data to be transmitted into packets, that include destination and source addresses along with network control information and error detection hash values. MAC circuitry 308 can be configured to process MAC headers of received packets by verifying data integrity, removing preambles and padding, and providing packet content for processing by higher layers.

Packet inspector 310 can determine which flow to associate with packet and flow related actions. A packet can contain a handle in a header or preamble that identifies a flow. FCH messages in a packet payload or preamble can be provided to transmit congestion manager 312. Transmit congestion manager 312 can implement quality of service (QoS) to potentially determine a new transmit scheme for packets in an identified congested flow.

For example, in response to receipt of an FCH message, transmit congestion manager 312 can implement traffic pacing to reduce a transmit rate of the identified flow(s) but subject to applicable service level agreements (SLAs) and quality of service (QoS). If a flow is repeatedly identified as causing congestion, the transmit rate for the flow can be reduced at an increasing rate for each FCH message received that identifies the flow.

In some embodiments, in addition or alternatively to reducing transmit rate, transmit congestion manager 312 can find an alternative path to avoid or reduce congestion and enable source based routing at the transmitter. For example, if congestion occurs at an intermediate network device (e.g., a switch that is not a final switch through which traffic must pass to reach an endpoint receiver), the network interface can cause a re-route of the flow to avoid the intermediate network device or at least avoid a congested port of the intermediate network device. In some examples, if a number of times congestion is identified for a flow exceeds a threshold level over a time period, the network interface can choose an alternative path to an endpoint receiver in addition to reducing a transmit rate of the flow. Transmit congestion manager 312 can maintain table 313 per flow that lists all possible routes to an endpoint receiver. The table can be populated by an SDN controller or orchestrator based on the topology. For a flow, more than one path can be available to an endpoint receiver. A path can be selected based on a hash (e.g., pseudo-random selection of uncongested paths). Table 313 can include a set of metrics that is updated based on the FCH messages flowing.

An example of a table 313 maintained at the network interface 300 is as described below. In some examples, table 313 can at least include the following fields.

| Field Name | Example Description |
|---|---|
| Rules | Selection of path based on policy specified rule. |
| Type | Type of flow. |
| Size | Size or duration of flow. |
| Route | Path length, hop, bandwidth, delay, reliability, load, path cost. |
| Path Delay | Processing delay, available bandwidth, link delay, packet pair delay. |
| Congestion state (e.g., communicated via FCH message) | Queue length, queueing delay, link delay, number of neighbors, history on congestion as received from reporter of congestion. |

If traffic congestion manager 312 decides to choose another route, traffic congestion manager 312 can choose an alternative path that is least congested based on information in the table. In order to avoid out-of-order packet reception at the end receiver, the new route is applied after the transmitter sees a long enough back off period (e.g., a long time gap between packets within a flow) so that transmitted packets in a route reach their end receiver before the route for the flow is changed. If the time gap between packets within a flow exceeds a configurable threshold then a new route is applied. A new route can be chosen before the time gap is exceeded but applied after the time gap is met or exceeded. For example, to use a new route, equal-cost multipath (ECMP) fields in a transmitted packet header can be adjusted to change path to an endpoint receiver. In some examples, to use a new route, a source port number can be changed for the flow. Transmit congestion manager 312 can notify transmit scheduler 314 of a new transmit rate or new path. Transmit scheduler 314 can determine a transmit rate based on control by transmit congestion manager 312.

Receive side scaling (RSS) 316 can provide distribution of received packets for processing by multiple CPUs or cores (not shown) using RSS. RSS 316 can involve calculation of a hash based on contents of a received packet to determine which CPU or core is to process a packet. Interrupt coalesce can be used to perform interrupt moderation whereby network interface interrupt coalesce 318 waits for multiple packets to arrive, or for a time-out to expire, before generating an interrupt to host system to process received packet(s). Receive Segment Coalescing (RSC) can be performed by network interface 300 whereby portions of incoming packets are combined into segments of a packet. Network interface 300 provides this coalesced packet to a memory location. Direct memory access (DMA) engine 320 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Processors 330 can be any a combination of a: processor, core, graphics processing unit (GPU), field programmable gate array (FPGA), application specific integrated circuit (ASIC), or other programmable hardware device that allow programming of network interface 300. For example, processors 330 can provide for identification of a resource to use to perform a workload and generation of a bitstream for execution on the selected resource. For example, a "smart network interface" can provide packet processing capabilities in the network interface using processors 330.

Memory 322 can be any type of volatile or non-volatile memory device and can store any queue or instructions used to program network interface 300. Transmit queue 324 can include data or references to data stored in memory for transmission by network interface. Receive queue 326 can include data or references to data that was received by network interface from a network and stored in memory. Descriptor queues 328 can include descriptors that reference data or packets in transmit queue 324 or receive queue 326 and corresponding destination memory regions. Bus interface 332 can provide an interface with host device (not depicted). For example, bus interface 332 can be compatible with PCI, PCI Express, PCI-x, Serial ATA, and/or USB compatible interface (although other interconnection standards may be used).

Figure 3B:
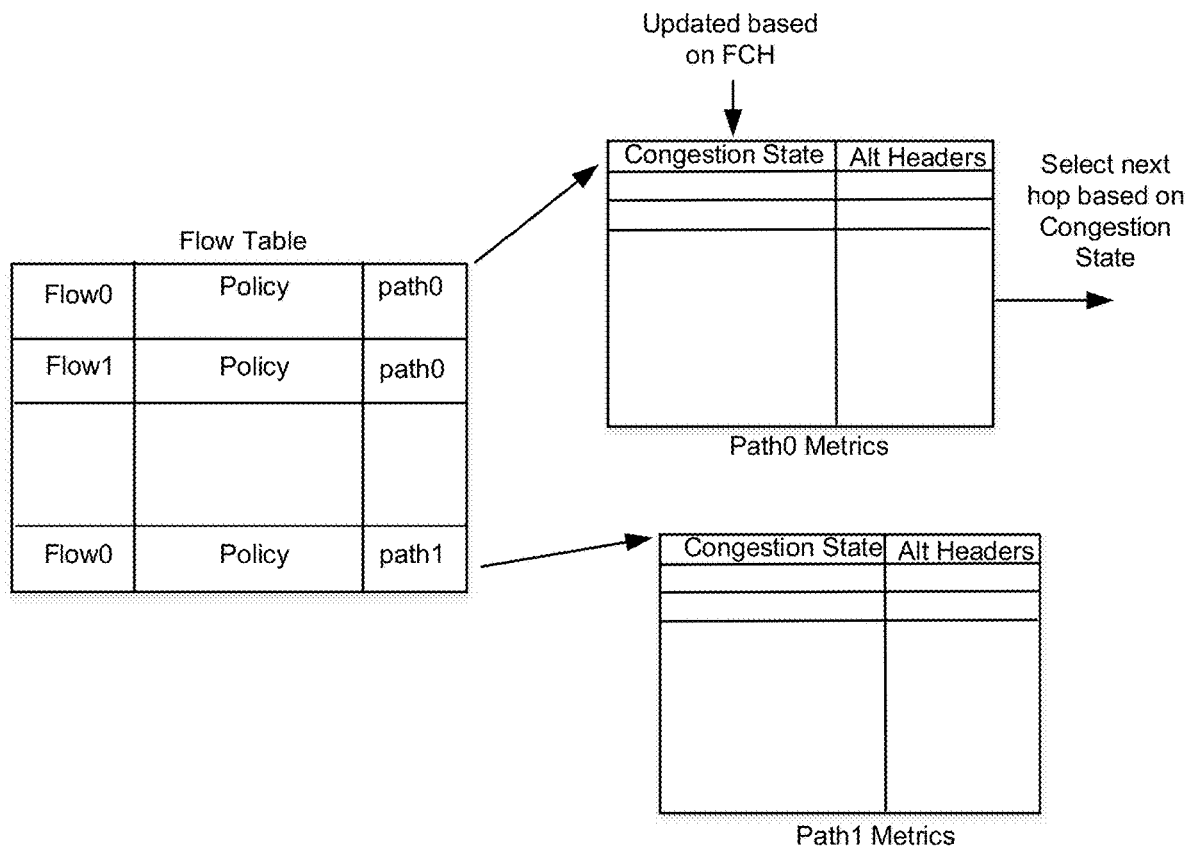
FIG. 3B depicts an example of a table to select alternative routes in accordance with some embodiments.

FIG. 3B depicts an example of use of a table to select alternative routes for a flow. For example, a flow table can be used to identify one or more paths available to a flow to a destination endpoint. A network device can select a path to a destination endpoint based a lowest expected transit time to the destination. In this example, a Flow0 can have path0 and path1 available for use. Flow1 can also use a path0. If Flow0 and Flow1 take path0 and Flow1 experiences congestion, Flow0 can remain on path0 but a rule can be changed for Flow1 to take another path. A policy could be used to determine what type of quality of service (QoS) rule to apply while choosing a route and path delays. For example, a policy can be based on one or more of Rules, Type, Size.

Figure 4:
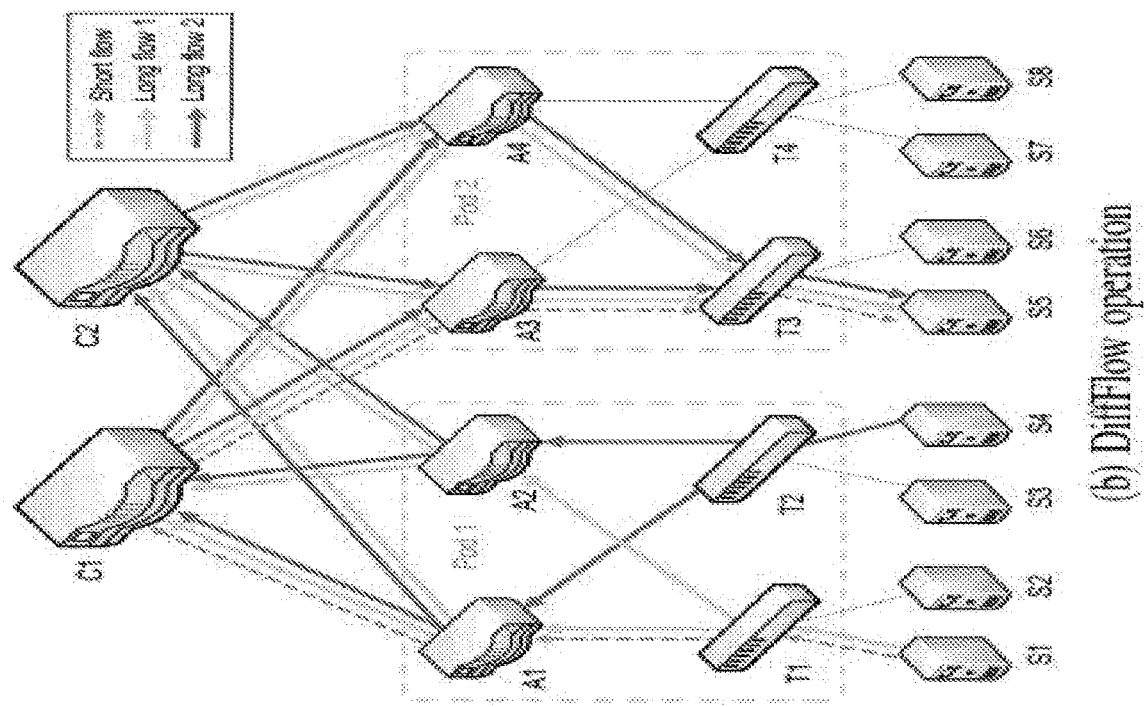
FIG. 4 depicts an example of a changed flow path in accordance with some embodiments.
Figure 4:
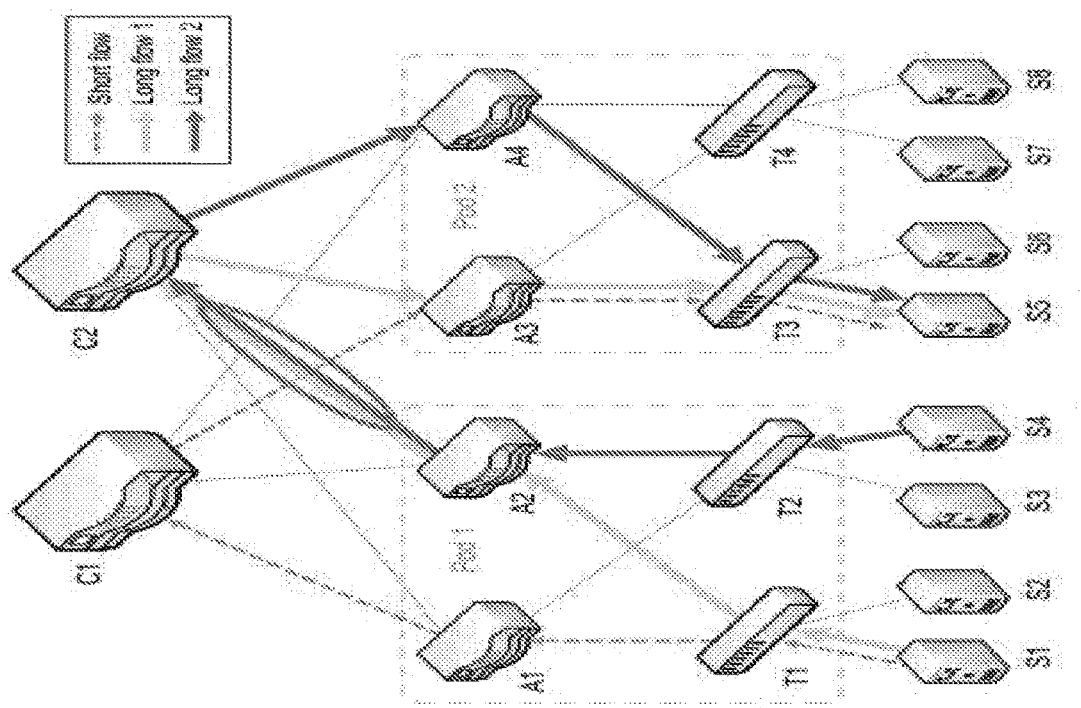

FIG. 4 depicts an example of changing flow path. The circled path between A2 and C2 is identified as congested and a flow is moved from transit between A2 and C2 to transmit between A1 and C1. Note however, for congestion between T3 and S5 or S6, a flow or traffic class cannot be re-routed to S5 or S6 and load balancing or transmit rate can be adjusted to alleviate congestion between T3 and S5 or S6.

Figure 5A:
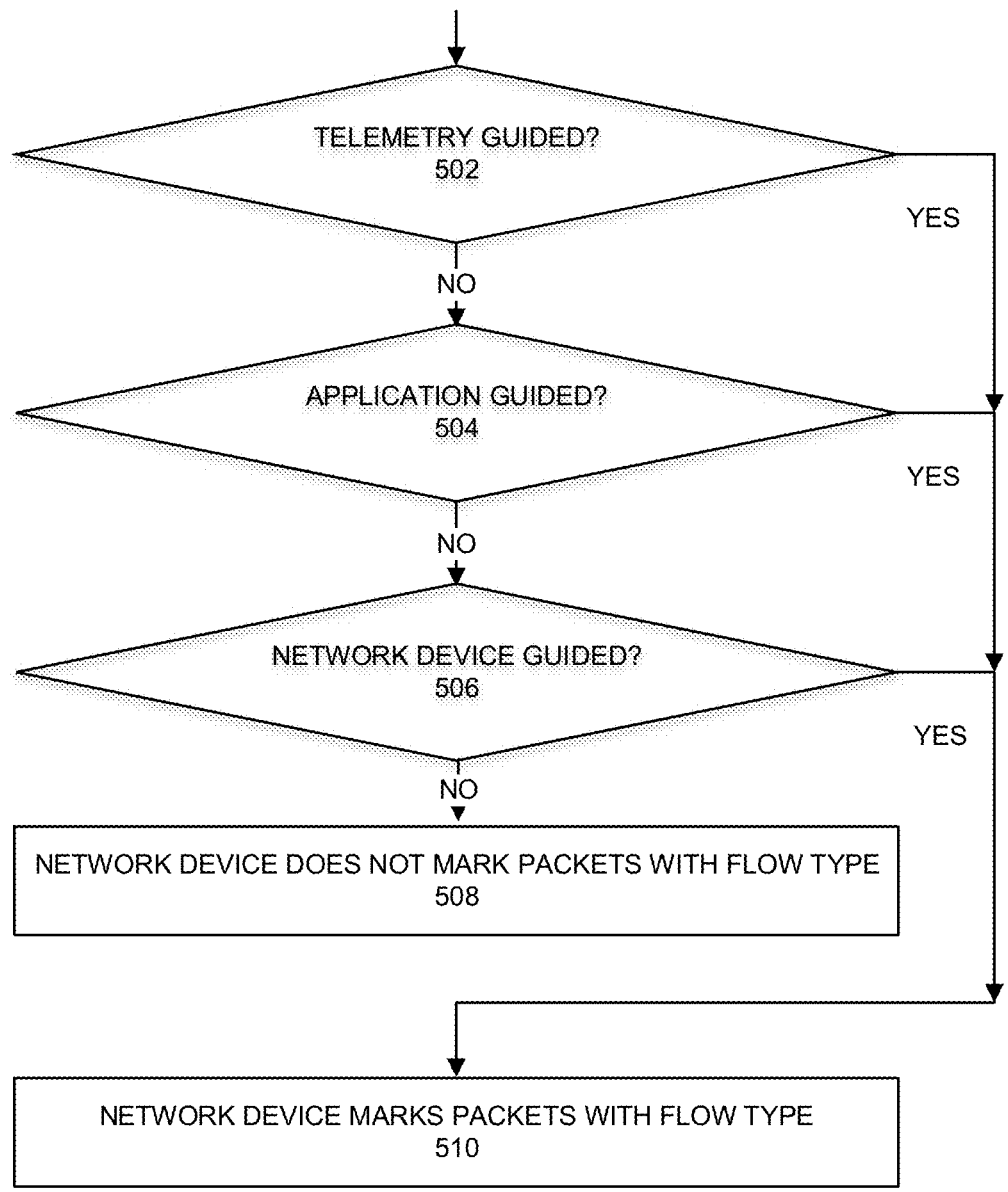
FIG. 5A depicts a process for identifying when to apply flow differentiation in accordance with some embodiments.

FIG. 5A depicts a flow diagram showing a congestion management scheme that can be applied by a network device. Flows can be differentiated proactively before encountering any congestion or even after congestion is encountered. At 502, the process makes a determination if flow differentiation is telemetry guided based on inferences from packet processing activities at the network device. For example, telemetry guided determination of flow differentiation (e.g., latency sensitive or latency insensitive) can be based on packet processing engines used. Based on the uses of processing engines (e.g., encryption, decryption, public key encryption (PKE), or private key encryption or decryption, and so forth), the process can detect if certain processing blocks are used and infer the type of traffic is latency sensitive based on use of processing blocks. For example, the more processing engines that are used, the more likely a traffic or flow is latency sensitive as the time for performing those operations are reduced by use of the processing engines. If the process does not determine the flow is latency sensitive based on telemetry, the process continues to 504. If the process infers the flow is latency sensitive based on telemetry, the process continues to 510.

At 504, the process makes a determination if flow differentiation is application guided whereby an application informs how to handle flow. For example, an API can be used to identify a latency sensitivity or latency insensitivity of one or more identified flows. If the process does not determine the flow is latency sensitive based on application guidance, the process continues to 506. If the process infers the flow is latency sensitive based on application guidance, the process continues to 510.

At 506, the process makes a determination if flow differentiation is network device guided whereby the network device performs a differentiation based on monitored flow characteristics. For example, a receive rate of a flow can be used to identify a flow as latency sensitive or latency insensitive. The process can identify a flow as latency insensitive if a receive rate of a flow is higher than a threshold (e.g., elephant flow). The process can identify a flow as latency sensitive if a receive rate of a flow is lower than a second threshold (e.g., mouse flow). If the process does not determine the flow is latency sensitive based on flow characteristics, the process continues to 508. If the process infers the flow is latency sensitive based on flow characteristics, the process continues to 510.

Note that the order of 502-506 can be modified to be any order. If none of 502-506 are used, at 508, the network device does not mark flow as a differentiated flow type and queuing of packets in the flow and egress polling can be handled as with any flow.

At 510, the process marks the flow as a differentiated flow type. In addition, the current network device can handle queuing of the flow in a manner prescribed for the flow. Techniques described herein with respect to queue allocation can be used for latency sensitive or latency insensitive flows.

Figure 5B:
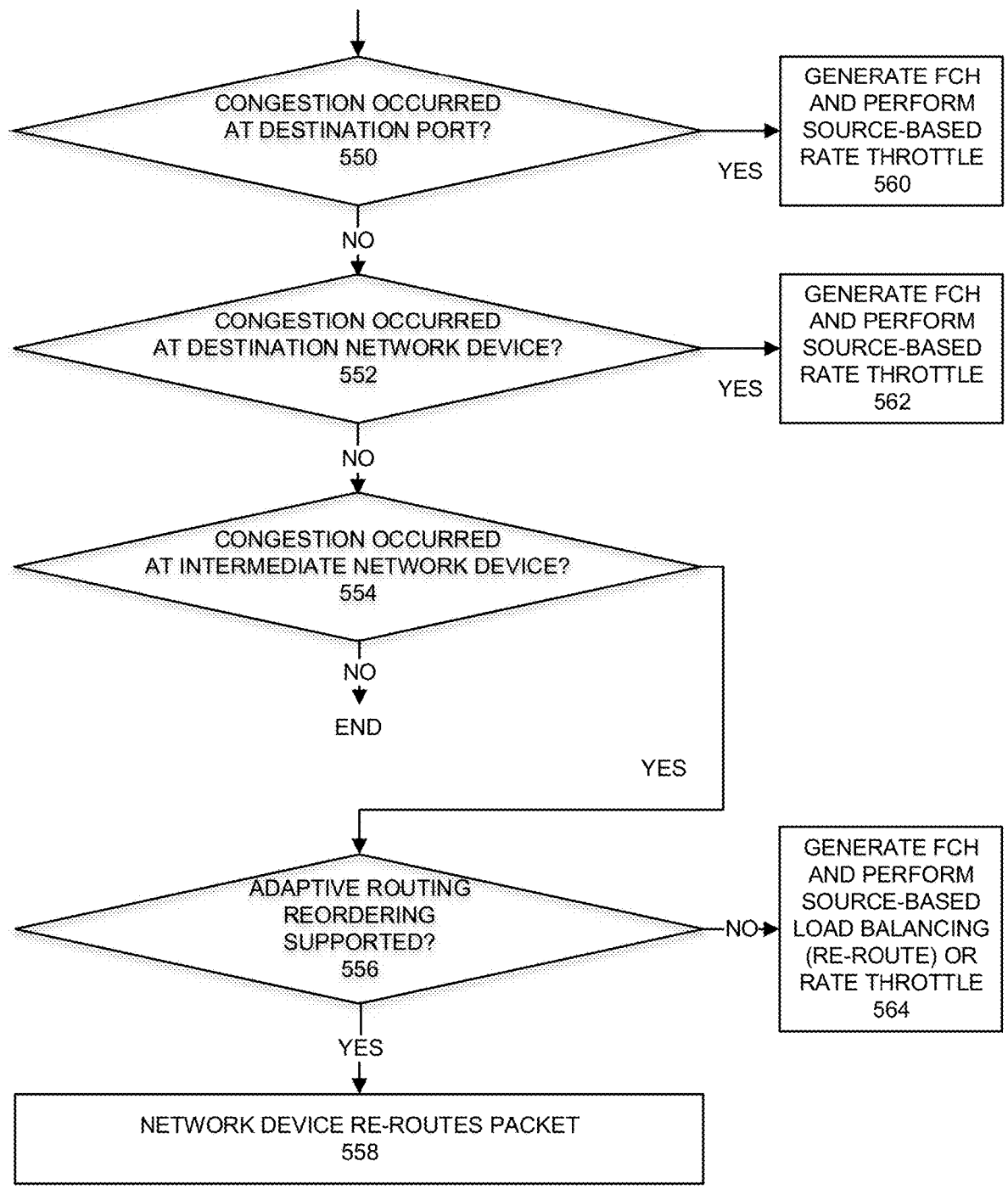
FIG. 5B illustrates a process that can be performed by one or more network devices to determine how to handle a received congestion hint message in accordance with some embodiments.

FIG. 5B illustrates a process that can be performed by one or more network devices to determine how to handle a received congestion hint message. At 550, the process determines if congestion is detected at an endpoint destination port. An endpoint destination port can be a port in a network device that is a final destination of packets in a flow. If congestion is detected at an endpoint destination port, at 560, the network device that includes the endpoint destination port generates an FCH message and transmits the FCH message to the source transmitter of the flow. The source transmitter can perform load balancing or rate throttling of the flow that caused congestion or is associated with congestion. If congestion is not detected at an endpoint destination port, then the process continues to 552.

At 552, the process determines if congestion occurs at a destination network device prior to a destination endpoint. For example, the destination network device prior to a destination endpoint can be a final switch connected to the through destination network device and the flow must traverse the final switch to reach the endpoint destination device. If the congestion occurs at a destination network device connected directly to a destination endpoint (e.g., a last traversed switch), at 562, the destination network device generates an FCH message and transmits the FCH message to the source transmitter of the flow. The source transmitter can perform transmit rate throttling of the flow that caused congestion or is associated with congestion. Note that if congestion occurs at the destination network device, the source transmitter cannot re-route the traffic to avoid the destination network device because the destination network device is the only connection to the destination endpoint and rate throttling is a suggested remedy. If congestion is not detected at a destination network device prior to a destination endpoint, then the process continues to 554.

At 554, the process determines if congestion occurs at an intermediate network device prior to a destination endpoint. For example, the intermediate network device can be a switch but not a final switch connected to the endpoint destination device. If the congestion occurs at an intermediate switch prior to a destination switch and prior to a destination endpoint, the process continues to 556. If congestion does not occur at any of the destination port, destination network device, or intermediate network device, the process can end.

At 556, the intermediate network device determines if fine grain adaptive routing (FGAR) with network device reordering support is available. FGAR can provide per-packet load balancing where a route of each packet is adjusted based on congestion. But packets in a flow can take a different path and can arrive out of order. If FGAR with network device reordering support is available, at 558, the intermediate network device re-routes packets in the flow.

FGAR may not be chosen if alternative paths around the congested intermediate network device are not available. The congestion may be at the destination switch or the destination endpoint but the destination switch or all paths are congested or enough information is not available on alternative paths or routes. Note that an endpoint receiver and can support packet reordering in some form.

If FGAR with network device reordering support is not available or chosen, then the intermediate network device continues to 564, to generate an FCH message and transmit the FCH message to the source transmitter of the congested flow. The source transmitter can throttle transmit rate or re-route the congested flow to another route that avoids the congested intermediate network device or its congested port.

Figure 6A:
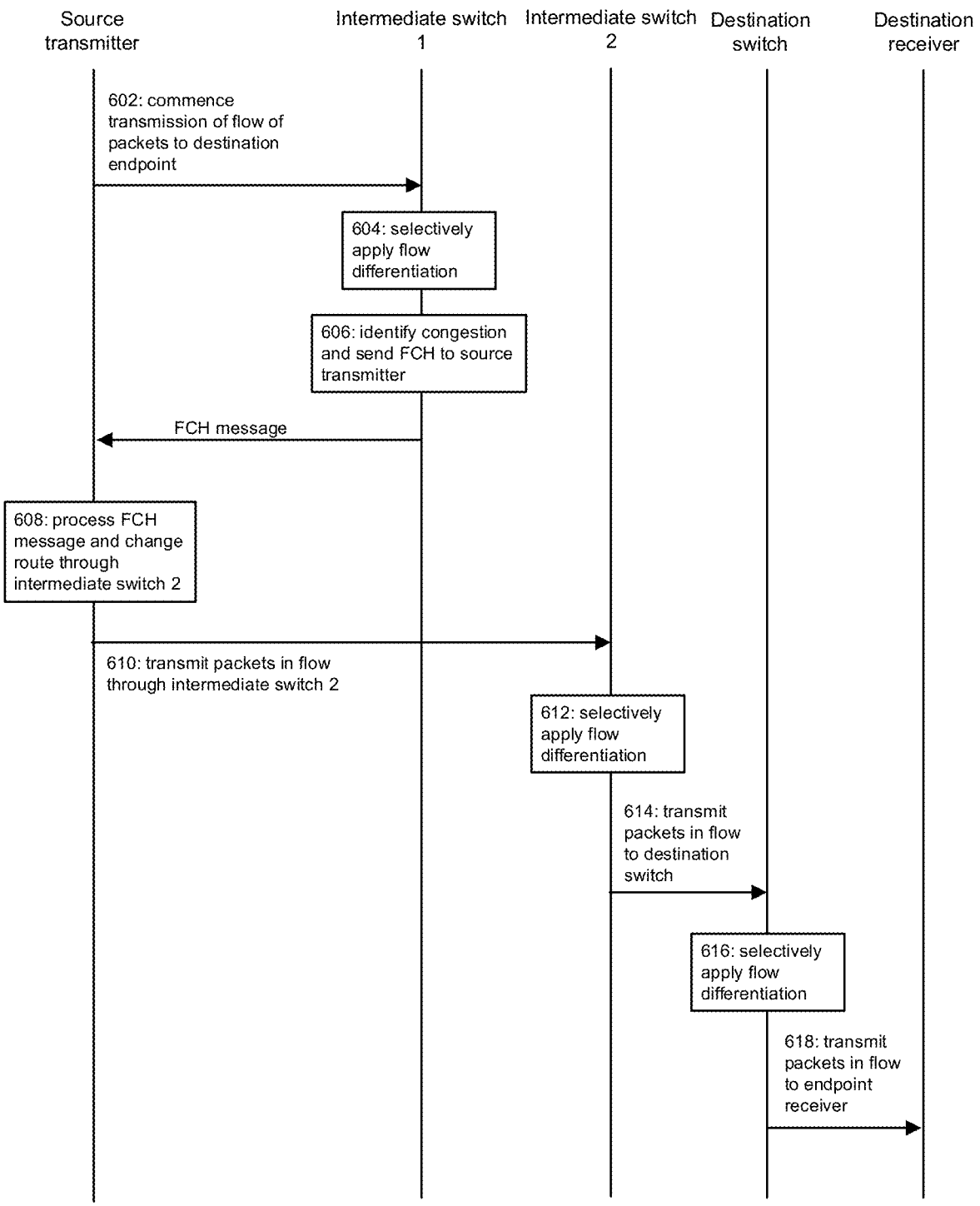
FIG. 6A depicts an example sequence of events in which a switch detects congestion in accordance with some embodiments.

FIG. 6A depicts an example sequence of events in which a switch detects congestion. At 602, a source transmitter transmits a flow of packets to a destination endpoint via one or more switches. At 604, an intermediate switch 1 receives the flow and selectively applies flow differentiation to the flow. The flow differentiation can be applied based on factors described herein such as but not limited to telemetry, inference, or application programming. At 606, the intermediate switch 1 determines that there is congestion caused by the flow and generates an FCH message and request to reduce transmit rate or change a route. At 608, the source transmitter determines to change a route and use intermediate switch 2 for the flow to reach the endpoint destination receiver. At 610, the source transmitter transmits packets in the flow to intermediate switch 2. At 612, the intermediate switch 2 receives the flow and selectively applies flow differentiation to the flow. At 614, intermediate switch 2 transmits packets in the flow to the destination switch. At 616, destination switch receives the flow and selectively applies flow differentiation to the flow. At 618, the destination switch transmits packets in the flow to the destination receiver.

Figure 6B:
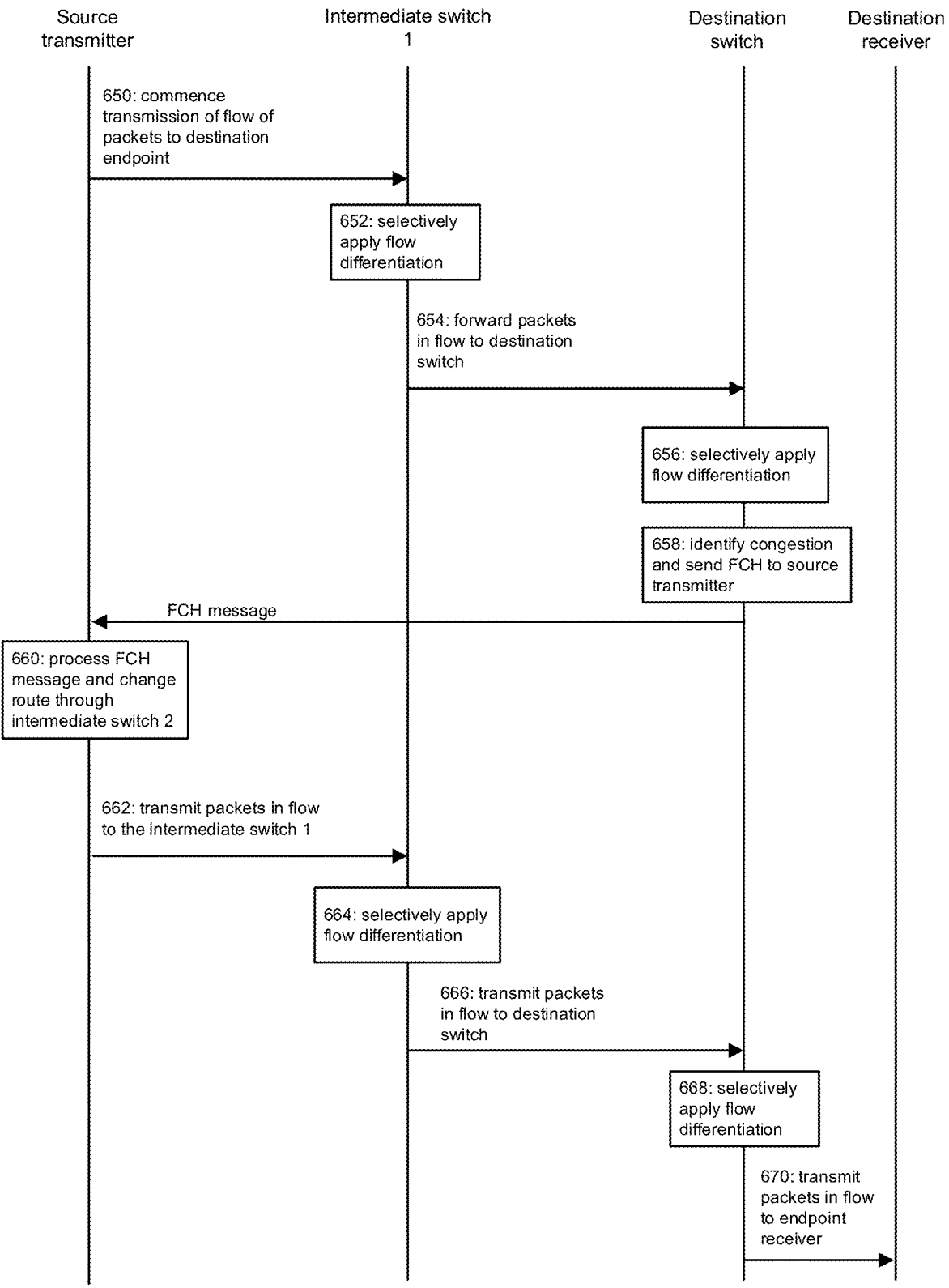
FIG. 6B depicts an example sequence of events in which a switch detects congestion in accordance with some embodiments.

FIG. 6B depicts an example sequence of events in which a switch detects congestion. At 650, a source transmitter transmits a flow of packets to destination endpoint via one or more switches. At 652, an intermediate switch 1 receives the flow and selectively applies flow differentiation to the flow. The flow differentiation can be applied based on factors described herein such as but not limited to telemetry, inference, or application programming. At 654, the intermediate switch 1 transmits packets in the flow to a destination switch. At 656, the destination switch receives the flow and selectively applies flow differentiation to the flow. At 658, the destination switch determines that there is congestion caused by the flow and generates an FCH message and request to rate limit. At 660, the source transmitter determines to reduce a transmit rate of the flow. At 662, the source transmitter transmits packets in the flow to intermediate switch 1. At 664, the intermediate switch 1 receives the flow and selectively applies flow differentiation to the flow. At 666, intermediate switch 1 transmits packets in the flow to the destination switch. At 668, the destination switch receives the flow and selectively applies flow differentiation to the flow. At 670, the destination switch transmits packets in the flow to the destination receiver.

Figure 7:
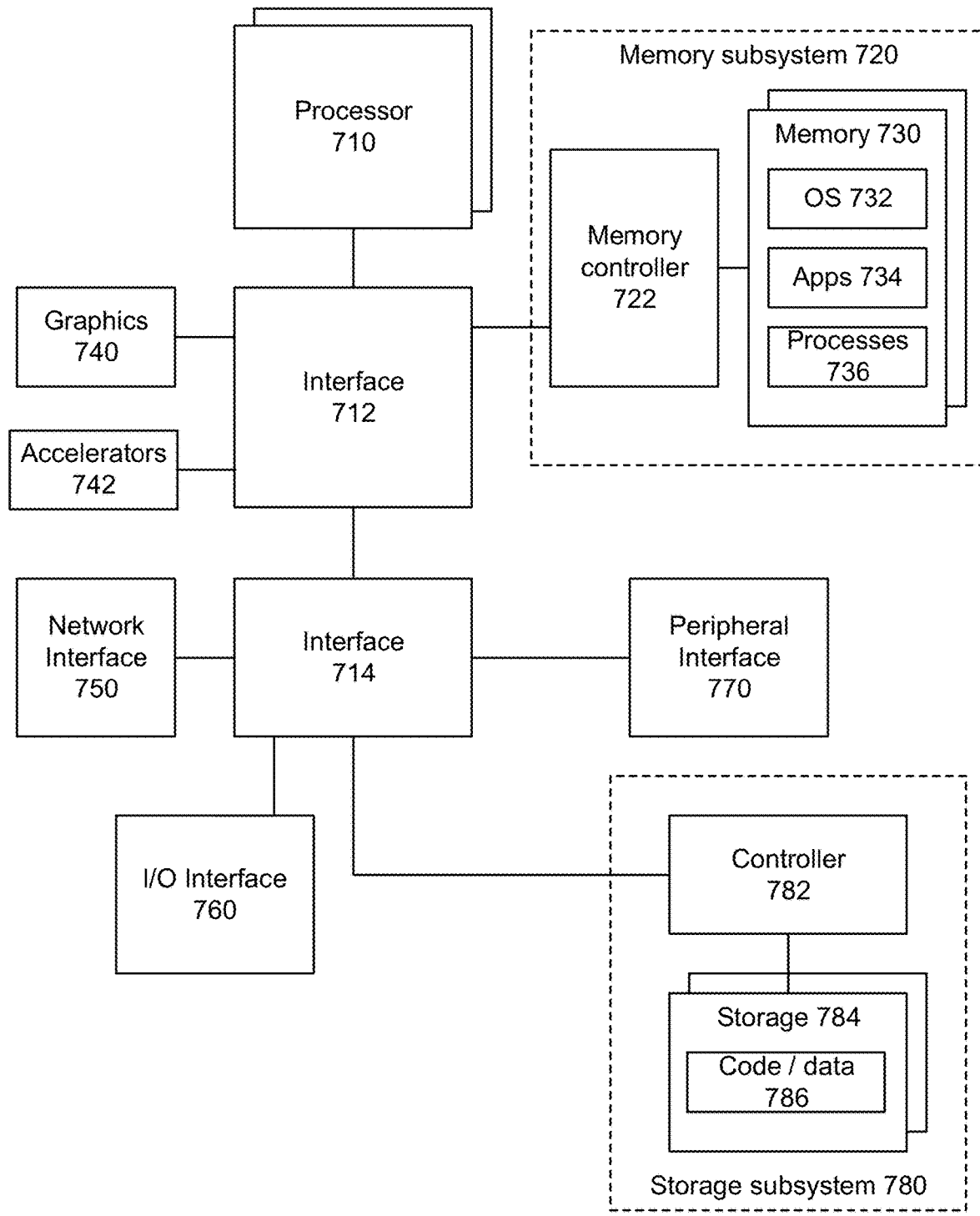
FIG. 7 depicts a system in accordance with some embodiments.

FIG. 7 depicts a system. The system can use embodiments described herein at least to mitigate congestion of one or more flows. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices)

over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a non-volatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 8:
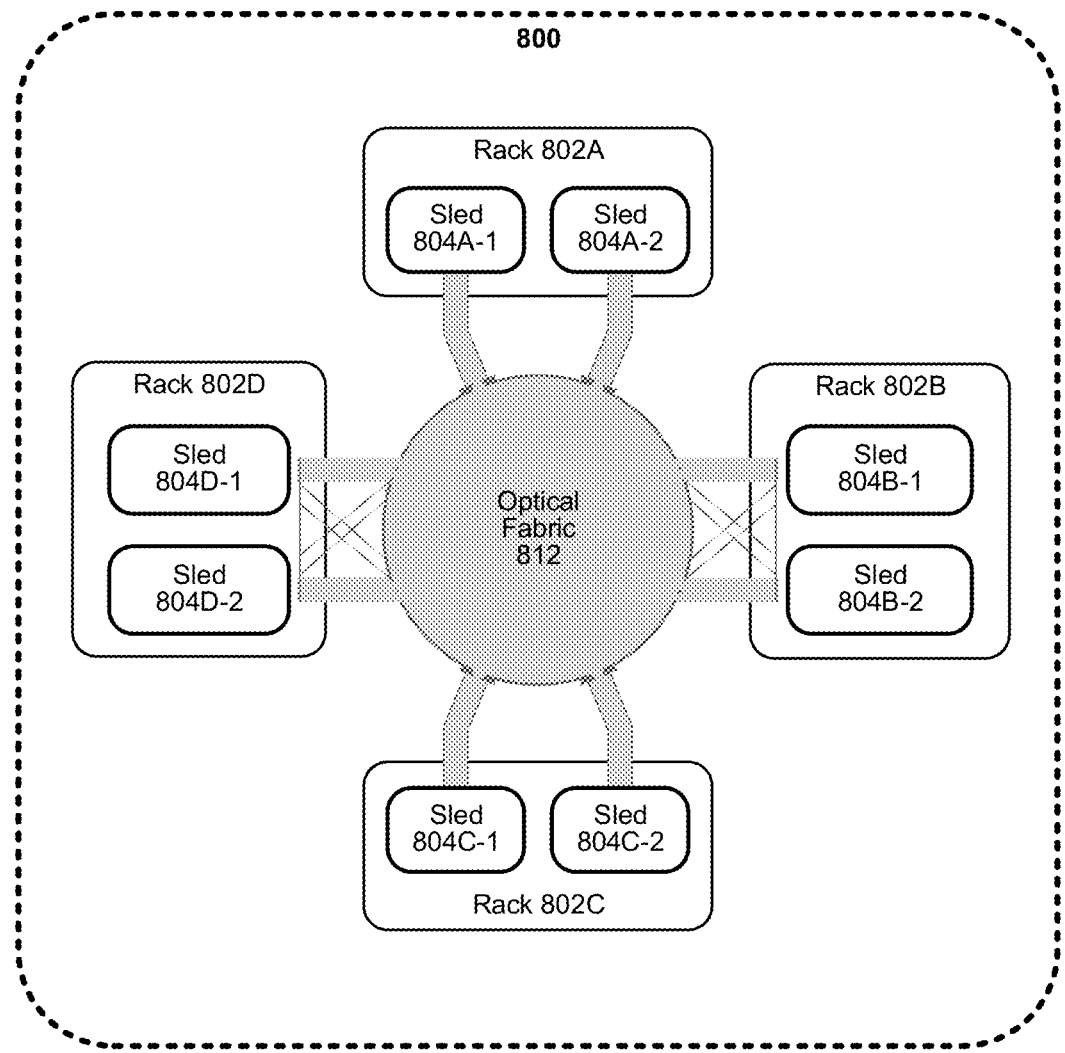
FIG. 8 depicts an example of a data center in accordance with some embodiments.

FIG. 8 depicts an example of a data center. Various embodiments can be used in or with the data center of FIG. 8 to provide data transfers. As shown in FIG. 8, data center 800 may include an optical fabric 812. Optical fabric 812 may generally include a combination of optical signaling media (such as optical cabling) and optical switching infrastructure via which any particular sled in data center 800 can send signals to (and receive signals from) the other sleds in data center 800. The signaling connectivity that optical fabric 812 provides to any given sled may include connectivity both to other sleds in a same rack and sleds in other racks. Data center 800 includes four racks 802A to 802D and racks 802A to 802D house respective pairs of sleds 804A-1 and 804A-2, 804B-1 and 804B-2, 804C-1 and 804C-2, and 804D-1 and 804D-2. Thus, in this example, data center 800 includes a total of eight sleds. Optical fabric 812 can provide sled signaling connectivity with one or more of the seven other sleds. For example, via optical fabric 812, sled 804A-1 in rack 802A may possess signaling connectivity with sled 804A-2 in rack 802A, as well as the six other sleds 804B-1, 804B-2, 804C-1, 804C-2, 804D-1, and 804D-2 that are distributed among the other racks 802B, 802C, and 802D of data center 800. The embodiments are not limited to this example. For example, fabric 812 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a network device comprising: a congestion manager to detect congestion caused by a flow, form a congestion hint message that identifies the congestion causing flow, and cause transmission of the congestion hint message to a transmitter of the flow, the congestion hint message comprising an indication of congestion level and a transmission device to transmit the congestion hint message to the transmitter of the flow independent of transmission to an endpoint destination of the flow.

Example 2 includes any example, wherein the congestion hint message includes a number of times congestion was detected for the flow.

Example 3 includes any example, wherein the congestion manager is to determine a latency sensitivity of the flow and select a queue for the flow based on the latency sensitivity of the flow.

Example 4 includes any example, wherein the latency sensitivity is based on an indication in an application programming interface (API) by an application associated with the flow.

Example 5 includes any example, wherein the latency sensitivity is based on an indication in a header of a packet, the indication comprising a traffic class (TC) associated with the flow.

Example 6 includes any example, wherein the latency sensitivity is based on a receive rate of the flow, wherein the congestion manager is to identify the flow as a mouse flow and latency sensitive if its receive rate is lower than a threshold or the congestion manager is to identify the flow as an elephant flow and latency insensitive if its receive rate is higher than a second threshold.

Example 7 includes any example, wherein the congestion manager is to identify the flow as latency sensitive based on usage of accelerator devices for packet processing of packets in the flow.

Example 8 includes any example, wherein to transmit the congestion hint message to the transmitter of the flow, the transmission device is to form a packet with a payload that includes the congestion hint message.

Example 9 includes any example, wherein the payload that includes the congestion hint message comprises one or more of: identification of the network device that detected congestion, an encoded version of an identifier of the flow, an identification of encoding used to encode the identifier, or a requested reduction in transmit rate for the flow.

Example 10 includes any example, wherein to transmit the congestion hint message to the transmitter of the flow, the transmission device is to form a packet with a preamble and the preamble includes the congestion hint message.

Example 11 includes any example, wherein the preamble that includes the congestion hint message comprises one or more of: identification of the network device that detected congestion, truncated identifier of the flow, or error protection code.

Example 12 includes any example, wherein the congestion hint message is to assist the transmitter of the flow to determine whether to reduce a transmit rate of the flow, select another route for the flow to its destination endpoint, or not change a transmit rate or route of the flow.

Example 13 includes any example, wherein the congestion hint message is to identify a network device that detected congestion.

Example 14 includes any example, wherein the congestion comprises one or more of: incast level being met or exceeded, packet drop rate being met or exceeded, bandwidth limit being met or exceeded, or queue depth level being met or exceeded.

Example 15 includes any example, and including a server, rack, or data center.

Example 16 includes a computer-implemented method comprising: receiving one or more packets associated with a flow; determining whether to queue one or more packets based on whether the flow is latency sensitive or latency insensitive; and based on detection of congestion of the flow, forming a congestion hint message for transmission to a transmitter of the flow, wherein the congestion hint message comprises identification of a network device that detected congestion of the flow and one or more of: number of times the flow has been congested over a period of time, identifier of the flow, or a requested reduction in transmit rate for the flow.

Example 17 includes any example, wherein determining whether to queue one or more packets based on whether the flow is latency sensitive or latency insensitive comprises processing an indication in an application programming interface (API) by an application associated with the flow.

Example 18 includes any example, wherein determining whether to queue one or more packets based on whether the flow is latency sensitive or latency insensitive comprises processing an indication in a header of a packet, the indication comprising a traffic class (TC) associated with the flow.

Example 19 includes any example, wherein determining whether to queue one or more packets based on whether the flow is latency sensitive or latency insensitive comprises determining a receive rate of the flow and wherein the flow comprises a mouse flow and latency sensitive if its receive rate is lower than a threshold or the flow comprises an elephant flow and latency insensitive if its receive rate is higher than a second threshold.

Example 20 includes any example, wherein determining whether to queue one or more packets based on whether the flow is latency sensitive or latency insensitive comprises identifying the flow as latency sensitive based on usage of accelerator devices for packet processing of the flow.

Example 21 includes any example and including: transmitting the congestion hint message in a payload of a packet to the transmitter of the flow, wherein the payload comprises one or more of: identification of the network device that detected congestion, an encoded version of an identifier of the flow, an identification of encoding used to encode the identifier, or a requested reduction in transmit rate for the flow.

Example 22 includes any example and including: transmitting the congestion hint message in a preamble of a packet to the transmitter of the flow, wherein the preamble that includes the congestion hint message comprises one or more of: identification of the network device that detected congestion, truncated identifier of the flow, or error protection code.

Example 23 includes an endpoint transceiver comprising: a memory and a network interface communicatively coupled to the memory, the network interface to: transmit a flow of packets to a destination endpoint receiver via zero or more network devices and based on receipt of a congestion hint message identifying the flow as a cause of congestion at a network device, applying rate limiting and/or selection of another route based on a congested network device identified in the congestion hint message, wherein the congestion hint message includes at least an indication of congestion level and a number of times congestion was detected for the flow.

Example 24 includes any example, wherein the network interface is to receive a packet comprising the congestion hint message, wherein a payload of the packet includes the congestion hint message and the payload comprises one or more of: identification of the network device that detected congestion, an encoded version of an identifier of the flow, an identification of encoding used to encode the identifier, or a requested reduction in transmit rate for the flow.

Example 25 includes any example, wherein the network interface is to receive a packet comprising the congestion hint message, wherein a preamble of the packet includes the congestion hint message and the preamble comprises one or more of: identification of the network device that detected congestion, truncated identifier of the flow, or error protection code.

What is claimed is:

1. A network device comprising:
   circuitry to detect congestion caused by a flow, form a congestion message that identifies the congestion causing flow, and cause transmission of the congestion message in at least one Ethernet packet to a source transmitter of packets of the flow via a network, the congestion message comprising an indication of an amount of congestion in a queue that receives packets of the flow at the network device and
   circuitry to transmit the congestion message in the at least one Ethernet packet, via the network, to the source transmitter of packets of the flow independent of transmission to an endpoint destination of the flow, wherein the circuitry to transmit is to transmit the congestion message in at least one payload of the at least one Ethernet packet to the source transmitter of packets of the flow and wherein the at least one payload comprises identification of the network device that detected congestion, an encoded version of an identifier of the flow, and an identification of encoding used to encode the identifier.

2. The network device of claim 1, wherein the congestion message includes a number of times congestion was detected for the flow at the network device.

3. The network device of claim 1, wherein the circuitry is to determine a latency sensitivity of the flow and select a queue for the flow based on the latency sensitivity of the flow.

4. The network device of claim 3, wherein the latency sensitivity is based on an indication in an application programming interface (API) by an application associated with the flow.

5. The network device of claim 3, wherein the latency sensitivity is based on an indication in a header of a received packet, the indication comprising a traffic class (TC) associated with the flow.

6. The network device of claim 3, wherein the latency sensitivity is based on a receive rate of the flow, wherein the circuitry is to identify the flow as a mouse flow and latency sensitive if its receive rate is lower than a threshold or the circuitry is to identify the flow as an elephant flow and latency insensitive if its receive rate is higher than a second threshold.

7. The network device of claim 3, wherein the circuitry is to identify the flow as latency sensitive based on usage of accelerator devices for packet processing of packets in the flow.

8. The network device of claim 1, wherein the at least one payload that includes the congestion message comprises a requested reduction in transmit rate for the flow and an identification of encoding used to encode the identifier of the congestion causing flow.

9. The network device of claim 1, wherein to transmit the congestion message to the source transmitter of packets of the flow, the circuitry to transmit is to form at least one packet with at least one preamble and the at least one preamble includes the congestion message and wherein the preamble that includes the congestion message comprises an identification of the network device that detected congestion and a truncated identifier of the congestion causing flow.

10. The network device of claim 1, wherein the congestion message is to assist the source transmitter of packets of the flow to determine an action of whether to reduce a transmit rate of the flow, select another route for the flow to its destination endpoint, or not change a transmit rate or route of the flow and apply the determined action.

11. The network device of claim 1, wherein the congestion message is to identify a network device that detected congestion.

12. The network device of claim 1, wherein the congestion comprises one or more of: incast level being met or exceeded, packet drop rate being met or exceeded, bandwidth limit being met or exceeded, or queue depth level being met or exceeded.

13. The network device of claim 1, comprising a server, rack, or data center.

14. A computer-implemented method comprising:
   receiving one or more packets associated with a flow;
   determining a queue to allocate to one or more packets based on whether the flow is latency sensitive or latency insensitive;
   based on detection of congestion of the flow, forming a congestion message in at least one Ethernet packet for transmission to a source transmitter of packets of the flow; and
   transmitting the congestion message in at least one payload of the at least one Ethernet packet to the source transmitter of packets of the flow, wherein the at least one payload comprises identification of a network device that detected congestion of the flow, a level of congestion in a queue that receives one or more packets of the flow, an encoded version of an identifier of a congestion causing flow, an identification of encoding used to encode the identifier, and one or more of:

number of times the flow has been congested over a period of time, or a requested reduction in transmit rate for the flow.

15. The computer-implemented method of claim 14, wherein determining a queue to allocate to one or more packets based on whether the flow is latency sensitive or latency insensitive comprises processing an indication in an application programming interface (API) by an application associated with the flow.

16. The computer-implemented method of claim 14, wherein determining a queue to allocate to one or more packets based on whether the flow is latency sensitive or latency insensitive comprises processing an indication in a header of a packet, the indication comprising a traffic class (TC) associated with the flow.

17. The computer-implemented method of claim 14, wherein determining a queue to allocate to one or more packets based on whether the flow is latency sensitive or latency insensitive comprises determining a receive rate of the flow and wherein
the flow comprises a mouse flow and latency sensitive if its receive rate is lower than a threshold or
the flow comprises an elephant flow and latency insensitive if its receive rate is higher than a second threshold.

18. The computer-implemented method of claim 14, wherein determining a queue to allocate to one or more packets based on whether the flow is latency sensitive or latency insensitive comprises identifying the flow as latency sensitive based on usage of accelerator devices for packet processing of the flow.

19. The computer-implemented method of claim 14, comprising:
transmitting the congestion message in at least one preamble of at least one packet to the source transmitter of packets of the flow, wherein the at least one preamble includes the congestion message comprises one or more of: identification of the network device that detected congestion, truncated identifier of the congestion causing flow, or error protection code.

20. A network interface controller (NIC) comprising:
an interface and
circuitry, coupled to the interface, the circuitry to:
cause transmission of a flow of packets to a destination endpoint receiver via one or more network devices and
based on receipt of a congestion message, transmitted from a second network device, in at least one Ethernet packet identifying the flow as a cause of congestion at the second network device, apply rate limiting and/or selection of another route based on a congested network device identified in the congestion message and an amount of congestion in a queue that receives packets of the flow at the second network device, wherein the congestion message comprises at least one payload of at least one Ethernet packet and the at least one payload includes at least an indication of the amount of congestion in the queue that receives packets of the flow at the second network device, identification of the second network device that detected congestion, an encoded version of an identifier of the flow, and an identification of encoding used to encode the identifier.

21. The NIC of claim 20, wherein the at least one payload of the at least one Ethernet packet comprises one or more of: an encoded version of an identifier of the flow causing congestion at the second network device, an identification of encoding used to encode the identifier, or a requested reduction in transmit rate for the flow causing congestion at the second network device.

22. The NIC of claim 20, wherein at least one preamble of the at least one Ethernet packet comprises one or more of:
identification of the second network device that detected congestion, truncated identifier of the flow causing congestion at the second network device, or error protection code.

23. The computer-implemented method of claim 14, comprising:
receiving an indication of latency sensitivity or insensitivity of the flow in at least one packet and
performing scheduling of packets of the flow based on the indication of latency sensitivity or insensitivity.

24. The network device of claim 1, wherein the indication of amount of congestion comprises high, medium, or low.

* * * * *